(No Model.)
J. BEAULIEU.
LASTING JACK.
No. 297,557. Patented Apr. 29, 1884.
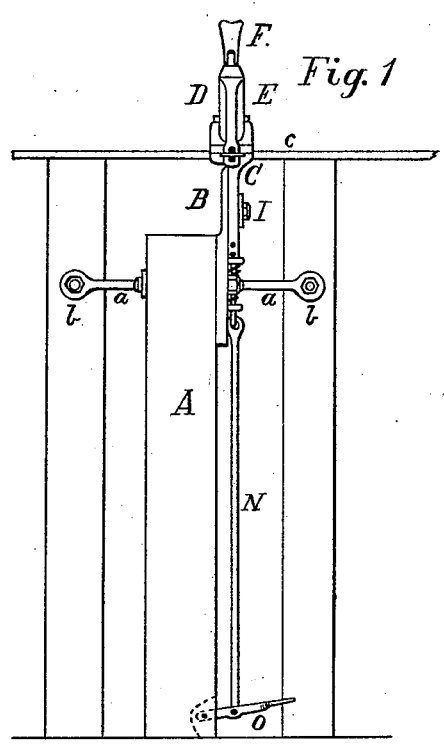
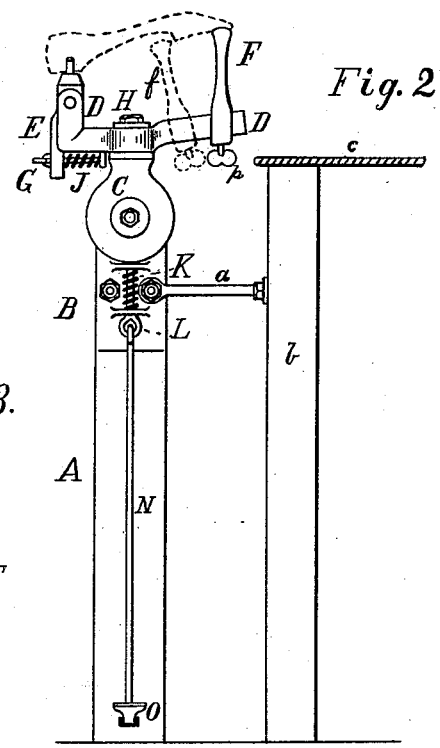
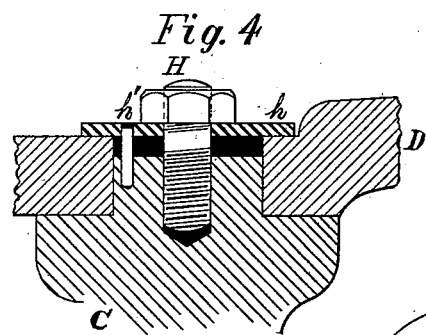
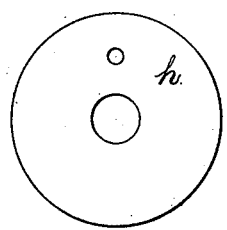
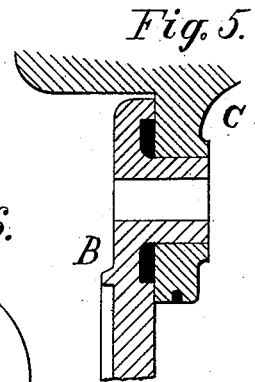
WITNESSES
C. H. Arnold
J. Greene
INVENTOR
J. Beaulieu
BY J. G. Arnold
ATTORNEY

UNITED STATES PATENT OFFICE.

JOSEPH BEAULIEU, OF WORCESTER, MASSACHUSETTS, ASSIGNOR OF ONE-HALF TO LEVI BEAULIEU, OF SAME PLACE.

LASTING-JACK.

SPECIFICATION forming part of Letters Patent No. 297,557, dated April 29, 1884.

Application filed February 13, 1884. (No model.)

*To all whom it may concern:*

Be it known that I, JOSEPH BEAULIEU, residing in the city and county of Worcester, State of Massachusetts, have invented an Improved Lasting-Jack, of which the following is a specification.

My invention relates to lasting jacks or holders for holding the work (shoes or boots) during the various manipulations of lasting, pegging, trimming, finishing, &c., its nature being fully shown in the following description and accompanying drawings of a "jack" embodying my invention.

In said drawings, Figure 1 is a side view as supported from the bench $c$ by the braces $a\ a$. Fig. 2 is a front view of the same, and Figs. 3, 4, 5, and 6 show some details on a larger scale.

A is a post or suitable support for the piece B, which is firmly bolted thereto, said piece B having a boss on which the piece C fits, as shown in Fig. 5, and is held thereon by washer and screw or other means, the piece C having holes in its lower edge to receive the spring-bolt L, and so arranged as to hold the piece C vertical, horizontal, and in other desired positions, the bolt L being connected to the foot-lever O, by which it can be easily released, and having a spring, K, to hold it to its work, a section of the joint B C being shown in Fig. 5. The piece C has a boss and shoulder to receive the piece D and allow it to turn in a plane at right angles to the joint B C, the screw H and washer $h$ holding the piece D and forming a friction-joint, the washer $h$ having a hole to receive the pin $h'$, which prevents it from turning, and enabling its friction to hold the piece D sufficiently firm for the various work to be done without its giving way, and yet allowing the work to be turned for access to all parts by extra force applied to the extremities of the piece D, whose motion will not affect the screw H. The back end of the piece D forms an arm, as shown, to receive the reversible rest F, which is held thereon by its thumb-screw $p$, the piece F being made to stand inclined on the arm, so that by reversing it its upper end will have more range of motion than its socket does on the arm D, thus increasing its capacity for small and large lasts, the broken lines $f$ showing the position of the rest F reversed and a little nearer the joint of D. The other end of the piece D is turned up, as shown, and fitted with a spring-pin, E, pivoted therein, the lower part of said pin having a slot for the bolt G, which screws into a stud on the under side of D, and has a spring, J, operating on the pin E, to hold the last in the usual way, with its toe resting on the rest F, the whole construction being designed to give a sufficiently firm support for pegging, and all other necessary work on boots or shoes capable of being done on a jack from a vertical to a horizontal position.

Having thus fully described my invention, I claim—

1. The lasting-jack described, consisting of the standard B, supported and braced as set forth, the swivel C, with its joints at each end, and the arm D, carrying a spring-pin and rest for supporting the work, all constructed and operating as and for the purposes set forth.

2. The combination of the standard B, supported and braced as set forth, the swivel C, joined thereto by a movable joint held by a spring-bolt and notch, and connected to the arm D by a friction-joint at right angles to the other, and the arm D, carrying the holding mechanism for the work, all constructed and operating substantially as described.

JOSEPH BEAULIEU.

Witnesses:
C. H. ARNOLD,
J. G. ARNOLD.